United States Patent [19]

Tsukada

[11] Patent Number: 5,454,645
[45] Date of Patent: Oct. 3, 1995

[54] LINEAR GUIDE APPARATUS

[75] Inventor: Toru Tsukada, Maebashi, Japan

[73] Assignee: NSK Ltd., Tokyo, Japan

[21] Appl. No.: 155,521

[22] Filed: Nov. 22, 1993

[30]  Foreign Application Priority Data

Nov. 30, 1992 [JP] Japan .................................. 4-320886

[51] Int. Cl.⁶ .................................................... F16C 29/06
[52] U.S. Cl. .............................................. 384/15; 384/45
[58] Field of Search ................................ 384/15, 16, 45, 384/43, 44

[56]  References Cited

U.S. PATENT DOCUMENTS

| 4,918,846 | 4/1990 | Tsukada | 384/15 |
| 5,092,685 | 3/1992 | Tonogai | 384/15 |
| 5,149,205 | 9/1992 | Tsukada | 384/15 |

FOREIGN PATENT DOCUMENTS 2-55515  11/1990  Japan .

*Primary Examiner*—Lenard A. Footland
*Attorney, Agent, or Firm*—Shapiro and Shapiro

[57]  ABSTRACT

The present invention provides a linear guide apparatus comprising an axially extending guide rail having axial rolling member receiving grooves formed in both side surfaces thereof, a slider mounted on the guide rail and having load rolling member movement grooves opposed to the rolling member receiving grooves, and a number of rolling members inserted between the rolling member receiving grooves and the load rolling movement grooves and adapted to shift the slider along the rail by rolling movements. The slider comprises a slider body in which the load rolling movement grooves are formed in inner surfaces of a pair of skirt portions of the slider body, and rolling member returning passages parallel with the load rolling movement grooves are formed in the skirt portions. A pair of end caps each having arcuate passages connecting the load rolling movement grooves and the corresponding rolling member returning passages are secured to respective end surfaces of the slider body. Further an easily and elastically deformable thin coating layer made of elastomer material is formed on a surface of the slider body.

11 Claims, 4 Drawing Sheets

LINEAR GUIDE APPARATUS

BACKGROUND OF THE INVENTION

1. Field of the Invention

The present invention relates to a linear guide apparatus used with an industrial machine such as a machine tool, robot and the like. More particularly, it relates to a linear guide apparatus in which a coating layer is formed on a slider body.

2. Related Background Art

As shown in FIGS. 5 and 6, in a typical conventional linear guide apparatus, axial rolling member receiving grooves 3 are formed in both longitudinal side surfaces of a guide rail 1 which extends axially and on which a slider 2 is mounted for axial relative movement with respect to the guide rail. The slider 2 comprises a metallic (e.g. copper) slider body 2A and a pair of plastic end caps 2B. Load rolling movement grooves 5 which are opposed to the rolling member receiving grooves 3 are formed in inner surfaces of the slider body 2A and rolling member returning passages 7 comprising through holes parallel with the grooves 3 are formed in skirt portions of the slider body. Each end cap 2B is provided with an arcuate passage 8 connecting the respective rolling movement groove 5 and the respective returning passage 7 and is secured to a corresponding end surface of the slider body 2A by screws n.

A number of rolling members (for example, steel balls) 6 are filled in a corresponding rolling member circulating path constituted by the respective rolling movement groove 5, rolling member returning passage 7 and arcuate passage 8, and these rolling members are held by a holder H in such a manner that, even when the slider 2 is dismounted from the guide rail 1, the rolling members do not come out from the rolling movement groove 5.

The linear guide apparatus having the above-mentioned arrangement is used, for example, to linearly guide a moving member of an industrial machine by attaching the guide rail 1 to a fixed surface of the industrial machine and attaching the slider 2 to the moving member of the industrial machine. When the slider is shifted together with the moving member of the industrial machine, the number of rolling members 6 inserted between the respective rolling member receiving grooves 3 of the guide rail 1 and the respective rolling movement grooves 5 of the slider 2 are shifted toward the end of the slider 2 at a speed slower than a moving speed of the slider 2 while supporting the load. When each rolling member reaches the end of the slider, it is turned back along the arcuate passage 8, and then is shifted through the returning passage 7 to reach the other arcuate passage 8 formed in the other end of the slider 2, where each rolling member is returned to the rolling movement groove 5 again.

Lubricant such as lubricant oil or grease poured from an oil supply nipple g is supplied to the rolling movement groove 5, rolling members 6 and rolling member receiving groove 3, thereby ensuring the smooth movement of the slider 2.

When the linear guide apparatus attached to the linearly moving portion of the industrial machine is being used, dust is accumulated in the exposed areas of the rolling member receiving grooves 3 of the guide rail 1 and the like and enters into the interior of the slider 2, thereby adding resistance to the rolling movements of the rolling members 6. To avoid this, normally, a dust preventing side seal 10 is attached to each end cap 2B. Further, an under seal (not shown) is attached to an under surface of the slider 2 to prevent the dust from entering into the interior of the slider from a lower portion of the slider.

In the above-mentioned conventional linear guide apparatus, the copper slider body 2A of the slider 2 must be machined by effecting machining operations such as cutting grinding and threading to form the rolling movement grooves 5 within which the rolling members 6 are rolled, the returning passages (through bores) 7 for circulating the rolling members 6 and the like. The accuracy of such machining operations greatly influences the accuracy of the linear guiding movement. However, normally, the slider body 2A is not subjected to any surface treatment and lubricant is merely coated on the slider body to prevent the body from rusting. Thus, although the surfaces of the rolling movement grooves 5 and the returning passages 7 to which the lubricant is always supplied are not easily rusted, there is a risk that the other portions of the slider body on which the lubricant was initially coated will become rusted after a long time has elapsed, thereby degrading the interior of the machine. Further, to prevent rusting in the forwarding of the apparatus, the apparatus must be coated by the anti-rust lubricant and then be rigorously packed to prevent the rust, thereby increasing the labor and cost.

In order to eliminate the aforementioned drawbacks, as disclosed in the Japanese Patent Publication No. 2-55515, there has been proposed a technique in which plating layers are formed on all of the outer surfaces of the slider body, other than the attachment reference surface and the load transferring surfaces, by black chrome plating treatment. The black chrome plating treatment is advantageous in that the slider body is hard to be rusted and the rust is unobtrusive accompanying effects cannot be expected at all. However, in such linear guide apparatuses, since the lubricant is always supplied to the relative rolling movement portions, it is necessary to prevent the leakage of the lubricant in order to ensure the smooth movements of the rolling members. Further, since a plurality of screws are threaded in the slider body, it is required to prevent the screws from unthreading.

SUMMARY OF THE INVENTION

The present invention aims to eliminate the above-mentioned conventional drawbacks. More particularly, an object of the present invention is to provide a linear guide apparatus that utilizes a different type of surface treatment which not only prevents rust, but also avoids the problems of leakage of lubricant and unthreading of screws, while providing various accompanying effects such as the reduction of noise and the like.

In order to achieve the above object, a linear guide apparatus according to the present invention may comprise an axially extending guide rail having axial rolling member receiving grooves formed in both side surfaces thereof, and a slider mounted on the guide rail for relative axial movement via rolling movements of a number of rolling members loaded in the rolling member receiving grooves and in load rolling movement grooves opposed to the rolling member receiving grooves. The slider may include a slider body having inner surfaces in which the load rolling movement grooves are formed and skirt portions in which rolling member returning passages parallel with the load rolling movement grooves are formed, and a pair of end caps each having an arcuate passage connecting the corresponding load rolling movement groove and rolling member returning passage and secured to respective end surfaces of the slider body. An easily and elastically deformable thin coating layer made of elastomer material is formed on the surface of the slider body.

The easily and elastically deformable thin elastomer coating layer has a sealing function for sealing interfaces between the slider body and other members, a function for preventing the unthreading of bolts for attaching such other members to the slider body, a function for reducing the noise due to the rolling movement of the rolling members and the like, as well as a highly effective anti-rust function.

DETAILED DESCRIPTION OF THE PREFERRED EMBODIMENTS

Figure 1:
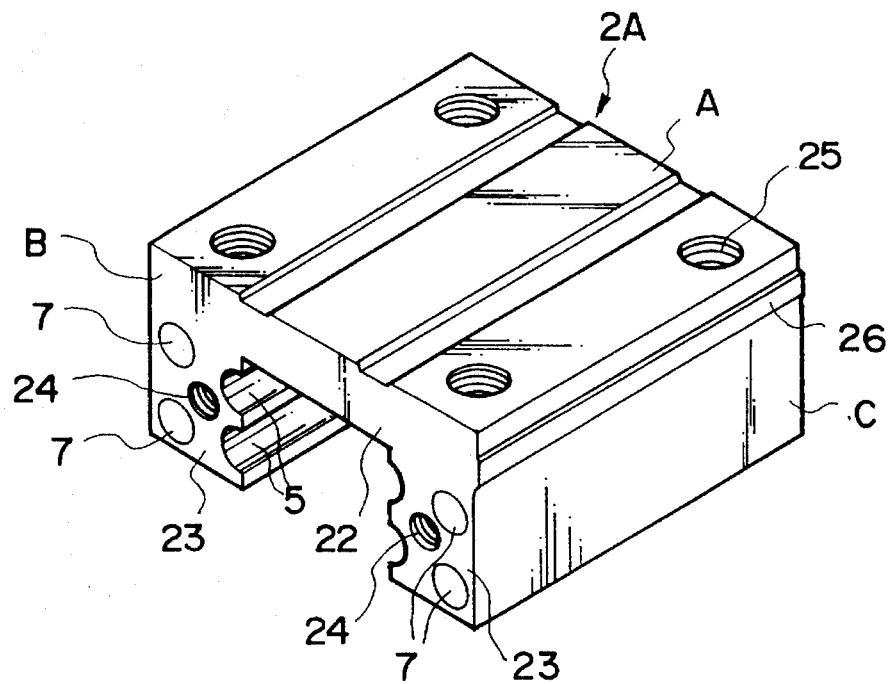
FIG. 1 is a perspective view of a slider body of a linear guide apparatus according to a preferred embodiment of the present invention, viewed from the above.
Figure 2:
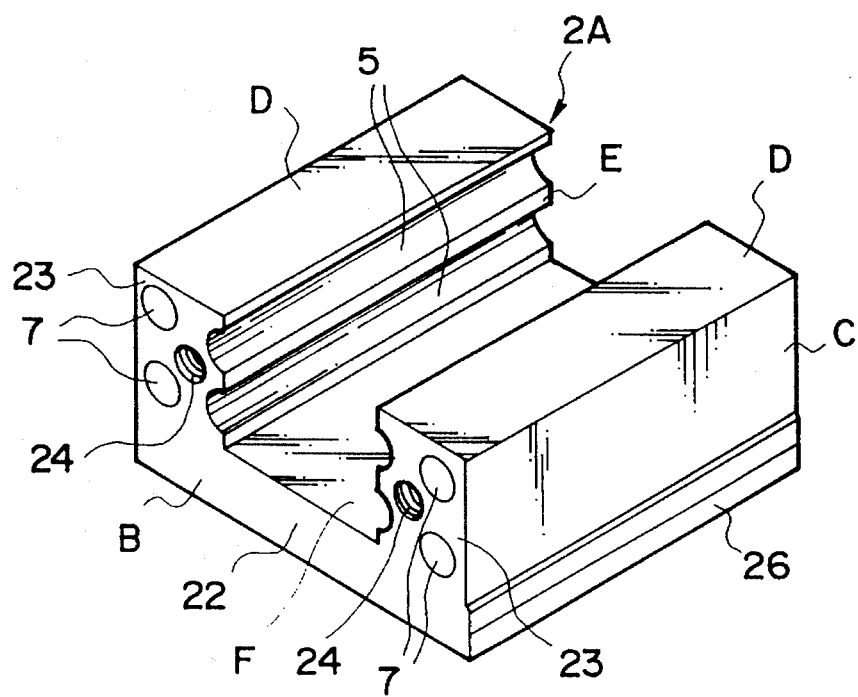
FIG. 2 is a perspective view of the slider body of FIG. 1 viewed from the below.

The present invention will now be explained in connection with the accompanying drawings. In the drawings, those elements which correspond to elements of the aforementioned conventional linear guide apparatus are designated by the same reference numerals. As seen in FIG. 1, slider body 2A has a substantially U-shaped section, and skirt portions 23 are depended downwardly from both ends of a horizontal portion 22. Two upper and lower load rolling movement grooves 5 each having an arcuate section and each extending in a longitudinal direction are formed in opposed inner surfaces of the skirt portions 23. Further, rolling member returning passages 7 corresponding to the respective rolling movement grooves 5 are formed in an enlarged portion of each skirt portion 23. Threaded holes 24 into which screws n (refer to FIG. 3) for attaching end caps 2B are to be threaded are formed in front and rear end surfaces of each enlarged portion.

Threaded holes 25 for attaching the slider 2 to a table of a machine and the like are formed in an upper surface of the horizontal portion 22 of the slider body 2A. Further, an attachment reference surface 26 acting as the reference for attaching the slider 2 to the table of the machine and the like is machined (by the grinding operation) in one side surface of the slider body 2A.

An easily and elastically deformable the coating layer made of elastomer material is formed on the substantially the entire external surface surfaces of the slider body 2A. More particularly, for example, a thin coating layer made of synthetic rubber or synthetic resin such as polyisobutylene, polyethylene and the like is formed on an upper surface A of the slider body 2A, front and rear end surfaces B of the slider body, left and right side surfaces C of the slider body, lower surfaces D of the skirt portions, inner side surfaces E of the skirt portions, and an under surface F of the horizontal portion 22, by a coating technique, welding technique or the like. Further, a thin coating layer is also formed on surfaces of the rolling movement grooves 5, surfaces of the rolling member returning passages 7, and inner surfaces of the threaded holes 24, 25 only in the proximity of inlets thereof.

Next, an operation of the linear guide apparatus according to the illustrated embodiment will be explained.

Since the surfaces of the slider body 2A according to the illustrated embodiment are coated by the easily and elastically deformable thin coating layer made of elastomer material (referred to as "elastomer coating layer" hereinafter), it is possible to obtain the anti-rust effect without applying any anti-rust oil specially.

The elastomer coating layer has the function for sealing interfaces between the slider body 2A and other members, as well as the anti-rust function. Referring FIG. 3, the end caps 2B are attached to the end surfaces B of the slider body 2A by the screws n. Naturally, a small gap is apt to be created in the interface between the slider body 2A made of metal and each end cap 2B made of hard plastic material. Further, when hard under seals 27 are attached to the under surfaces D of the skirt portions of the slider body 2A by ribets 28 and the like, small gaps are apt to be created in the interfaces between the skirt portions and the under seals. In the illustrated embodiment, the elastomer coating layer can easily be deformed elastically to fill up such small gaps, thereby preventing the lubricant from leaking through such gaps.

Figure 3:
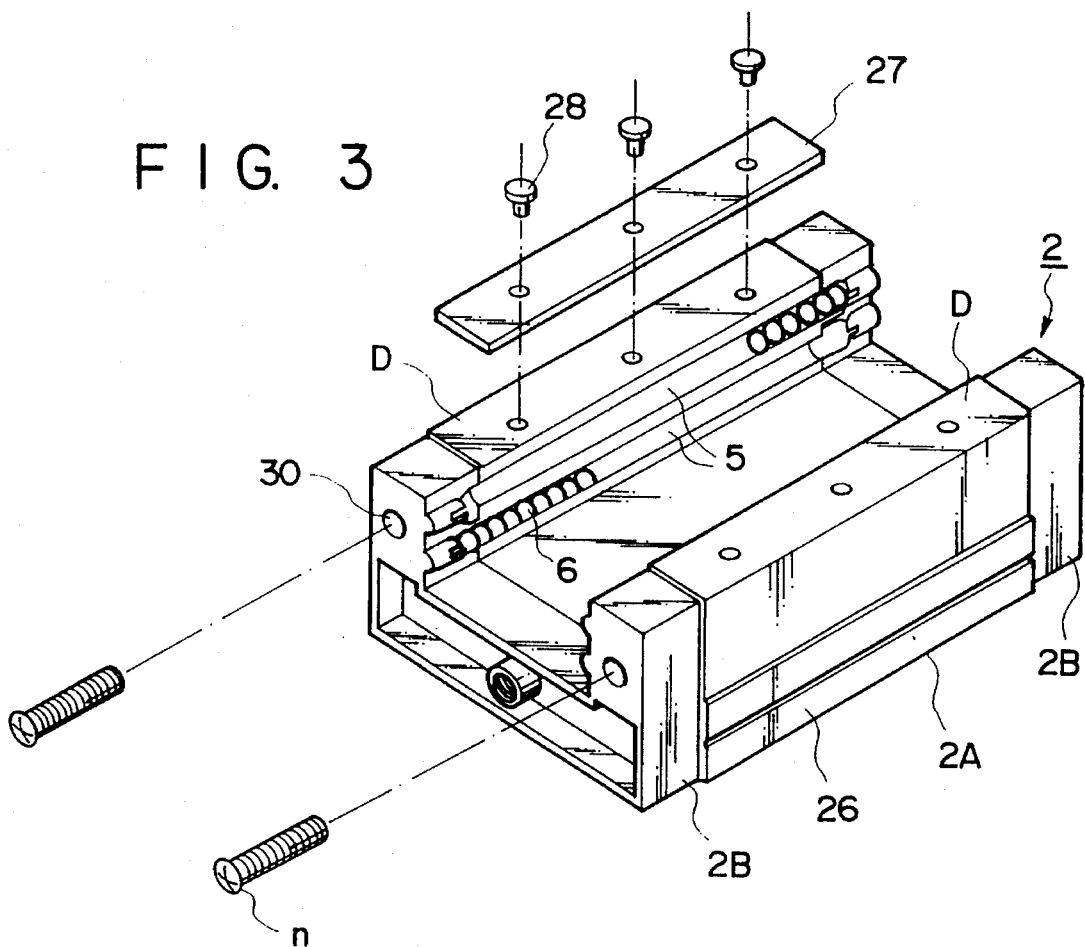
FIG. 3 is a perspective view of a slider in which end caps, rolling members and under seals are incorporated to the slider body of FIG. 1, viewed from the below.

Further, the elastomer coating layer according to the illustrated embodiment also has the function for preventing the unthreading of the attachment screws for attaching other members to the slider body 2A. For example, as shown in FIG. 3, in order to secure the end caps 2B to the end surfaces of the slider body 2A, the screws n inserted into through holes 30 formed in the end caps 2B are tightly threaded into the threaded holes 24 formed in the end surfaces of the slider body 2A. In the illustrated embodiment, since the elastomer material is entered slightly into the inlets of the threaded holes 24, when the screws n are tightly threaded into the threaded holes, the elastomer coating layer coated on the threaded surface of each threaded hole is wedged in the gap between the threaded surfaces of the screw and the threaded hole, thereby, effectively preventing the screw from unthreading. Such function for preventing the unthreading of the screws can also be obtained regarding the threaded holes 25 formed in the upper surface A of the slider body 2A.

Further, the elastomer coating layer according to the illustrated embodiment also has the function of reducing the noise generated due to the rolling movements of the rolling members. In the conventional construction, when the number of the rolling member 6 are rollingly moved along the endless circulating path as the slider 2 is shifted, the rolling noise is increased, particularly in the tunnel-shaped returning passages 7, to a level which can be annoying. However, in the illustrated embodiment, the inner diameter of each returning passage 7 are made slightly greater than the conventional returning passage and the inner surface of each returning passage is coated by the elastomer coating layer, whereby the steel rolling members 6 are not struck against the metallic surfaces of the returning passages directly, thereby reducing the noise.

Figure 4:
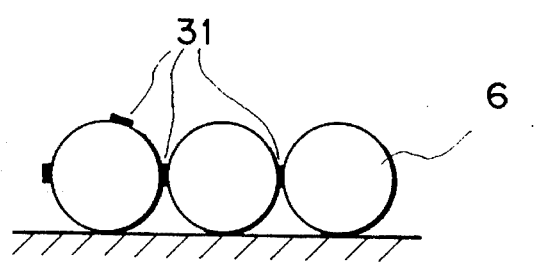
FIG. 4 is a schematic view for explaining an example of the noise reducing function of an elastomer coating layer of the apparatus according to the present invention.
Figure 5:
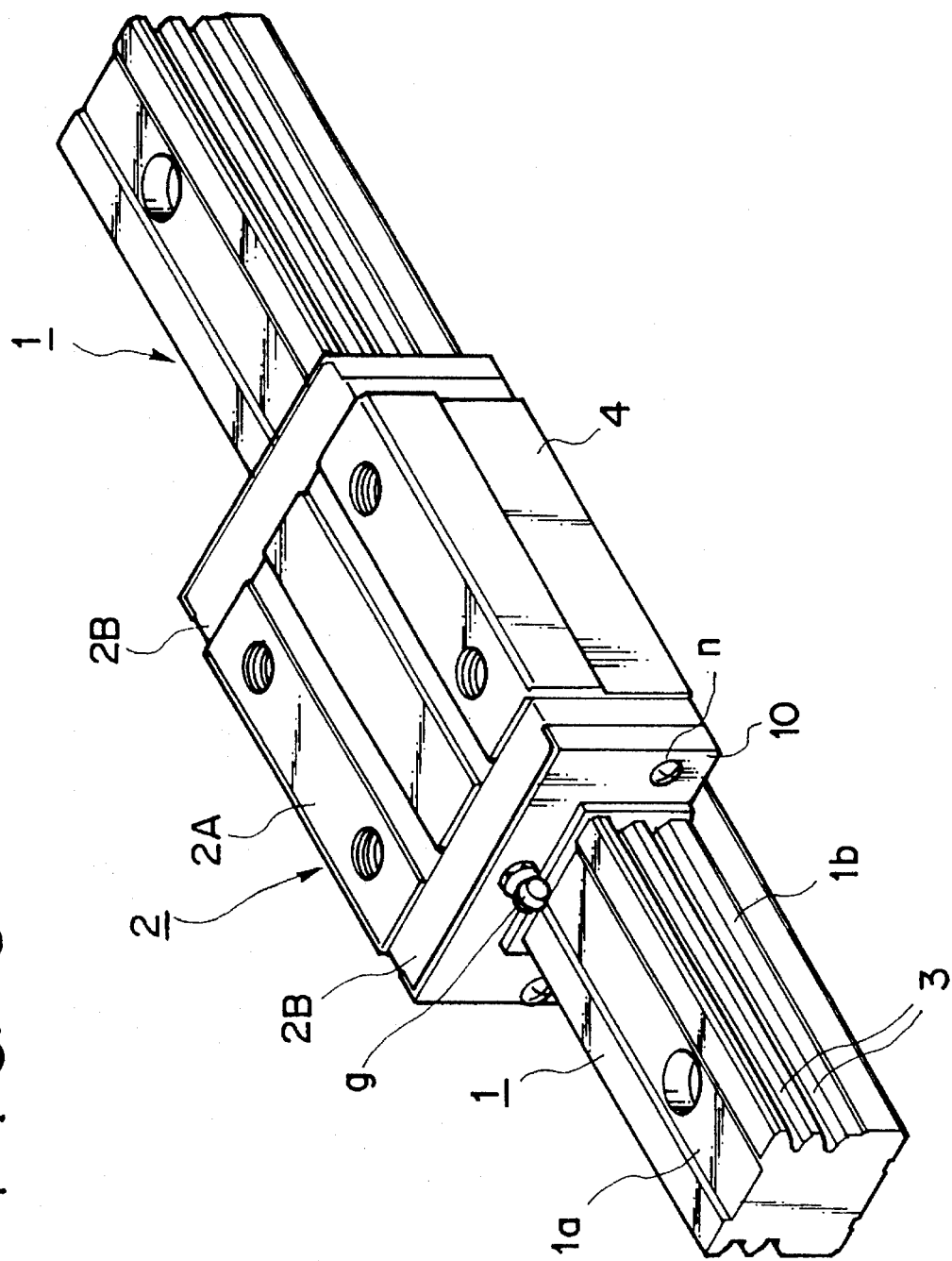
FIG. 5 is a perspective view showing an example of a conventional linear guide apparatus.
Figure 6:
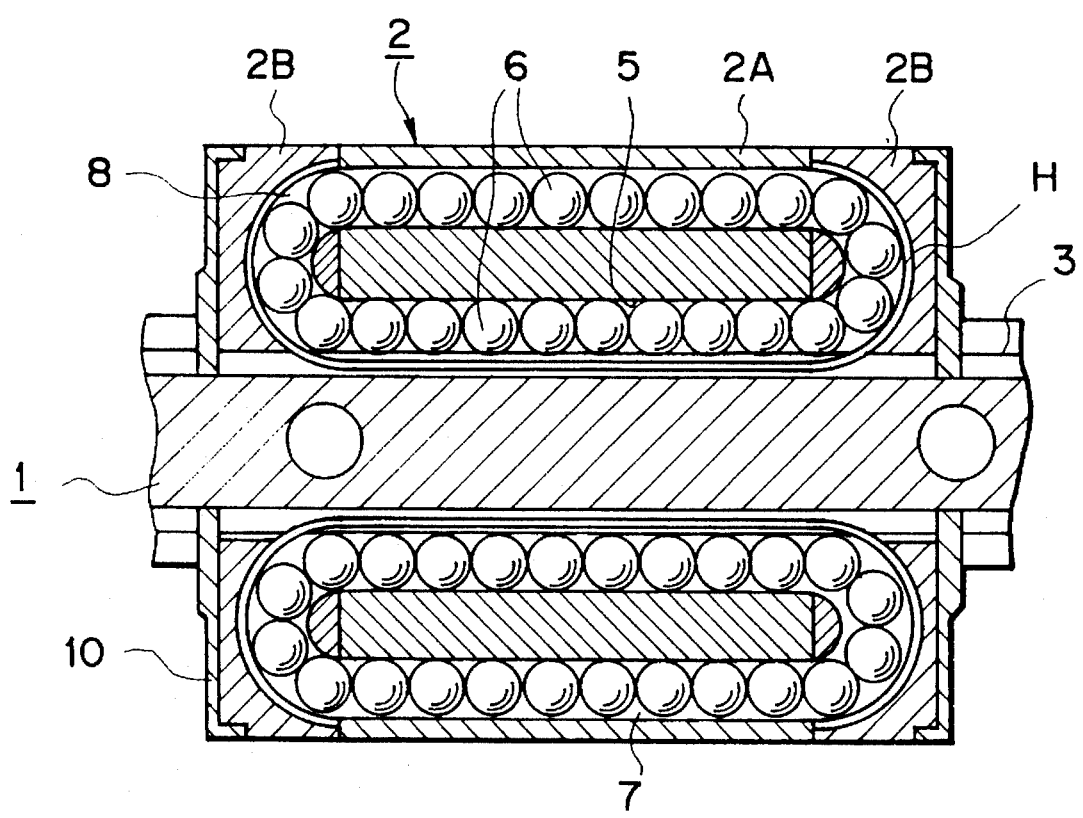
FIG. 6 is a horizontal sectional view of the apparatus of FIG. 5.

Further, in the illustrated embodiment, since the elastomer coating layer is also formed on the inner surface of each rolling movement groove 5 formed in the inner surface of the slider body 2A, as the circulating movements of the rolling members 5 in the rolling movement grooves 5 are repeated, the elastomer coating layer is peeled from the inner surface of each rolling movement groove 5 gradually. As shown in FIG. 4, the peeled elastomer chips 31 are adhered to the surfaces of the rolling members 6 to suppress the direct collision between the rolling members 6, thereby reducing the collision noise.

In a linear guide apparatus which is used when suppressing of pitching and yawing is required in order to achieve highly accurate movement, a pre-pressure is generally applied to the linear guide apparatus to eliminate any clearances in the linear guide apparatus and to minimize an amount of the elastic deformation due to the external load, thereby increasing the rigidity. In use of the invention with such a pre-pressurized linear guide apparatus, after the elastomer coating layer is applied to substantially the whole surface of the slider body, the elastomer coating layer portions formed on the inner surfaces of the rolling movement grooves 5 and the attachment reference surface 26 at one side surface of the slider body may be removed by a grinding operation. Alternatively, before the elastomer coating layer is applied on the slider body 2A, a masking may be applied on the inner surfaces of the rolling movement grooves 5 and the attachment reference surface 26, and then the elastomer coating layer is applied over the whole surface of the slider body 2A.

By ensuring the accuracy of the rolling movement grooves 5 and the attachment reference surface 26 in this way (i.e., by the removal of the elastomer coating layer portions by grinding after the formation of the elastomer coating layer or by the formation of the elastomer coating layer after masking), the high attachment accuracy of the linear guide apparatus to the machine and the high movement accuracy of the linear guide apparatus are also ensured.

In the illustrated embodiment, the present invention is applied to the linear guide apparatus wherein two rolling member receiving grooves are provided at each side of the apparatus. It is apparent, however, that a single rolling member receiving groove, or three or more rolling member receiving grooves may be provided at each side of the linear guide apparatus. Further, the rolling member is not limited to the ball, but may be a roller.

As mentioned above, according to the linear guide apparatus of the present invention, it is possible to provide a high accurate linear guide apparatus wherein not only the high anti-rust effect can be obtained without applying any anti-rust lubricant, but also the problems of unthreading of screws and leakage of lubricant oil can be prevented, and the noise is minimized.

What is claimed is:

1. A linear guide apparatus comprising:
   an axially extending guide rail having axial rolling member receiving grooves formed in two side surfaces thereof;
   a slider mounted on said guide rail and having load rolling movement grooves opposed to said rolling member receiving grooves; and
   a number of rolling members inserted between said rolling member receiving grooves and said load rolling movement grooves to enable relative sliding of said slider and said guide rail by rolling movements;
   wherein said slider comprises a slider body and a pair of end caps secured to respective end surfaces of said slider body, said slider body including a pair of skirt portions having surfaces facing said side surfaces of said guide rail and in which said load rolling movement grooves are formed and rolling member returning passages extending along said load rolling movement grooves, and each end cap has a passage connecting a load rolling movement groove and the corresponding rolling member returning passage; and
   wherein a thin coating layer made of elastomer material is formed on a surface of said slider body.

2. A linear guide apparatus according to claim 1, wherein said coating layer is formed on an attachment surface of said slider body for attachment to a table of a machine, and on said end surfaces of said slider body so as to provide an interface between said slider body and said end caps.

3. A linear guide apparatus according to claim 2, wherein said slider body has threaded holes for receiving screws or bolts for attaching said slider body to said machine table and for securing said end caps to said slider body, and said coating layer is formed on said load rolling movement grooves and said rolling member returning passages and extends into said threaded holes.

4. A linear guide apparatus according to claim 1, wherein said elastomer material comprises synthetic rubber or synthetic resin.

5. A linear guide apparatus according to claim 4, wherein said elastomer material comprises one of polyisobutylene and polyethylene.

6. A linear guide apparatus comprising:
   a guide rail having longitudinally extending rolling member receiving grooves formed on two side surfaces thereof;
   a slider mounted on said guide rail and having load rolling movement grooves opposed to said rolling member receiving grooves; and
   rolling members inserted between said rolling member receiving grooves and said load rolling movement grooves to enable relative sliding of said slider and said guide rail by rolling movements;
   wherein said slider comprises a slider body and a pair of end caps secured to respective ends of said slider body, said slider body including a pair of skirt portions in which said load rolling movement grooves are formed and in which rolling member returning passages are formed to extend along said load rolling movement grooves, and each end cap has a passage connecting a load rolling movement groove and the corresponding rolling member returning passage; and
   wherein substantially the entire exterior of said slider body is coated with a thin layer of elastomer material.

7. A linear guide apparatus according to claim 6, wherein said slider body has threaded holes for receiving screws or bolts for securing said end caps thereto, and said coating layer extends into said threaded holes.

8. A linear guide apparatus according to claim 7, wherein said slider body has at least one threaded hole for receiving a screw or bolt for attaching said slider body to a machine, an said coating layer extends into said threaded hole.

9. A linear guide apparatus comprising:
   a guide rail having longitudinally extending rolling member receiving grooves formed on two side surfaces thereof;
   a slider mounted on said guide rail and having load rolling movement grooves opposed to said rolling member receiving grooves; and
   rolling members inserted between said rolling member receiving grooves and said load rolling movement grooves to enable relative sliding of said slider and said guide rail by rolling movements;

wherein said slider comprises a slider body and a pair of end caps secured to respective ends of said slider body, said slider body including a pair of skirt portions in which said load rolling movement grooves are formed and in which rolling member returning passages are formed to extend along said load rolling movement grooves, and each end cap has a passage connecting a load rolling movement groove and the corresponding rolling member returning passage; and wherein substantially the entire exterior of said slider body, other than said load rolling movement grooves and an attachment reference surface of said slider body, is coated with a thin layer of elastomer material.

10. A linear guide apparatus according to claim 9, wherein said slider body has threaded holes for receiving screws or bolts for securing said end caps thereto, and said coating layer extends into said threaded holes.

11. A linear guide apparatus according to claim 10, wherein said slider body has at least one threaded hole for receiving a screw or bolt for attaching said slider body to a machine, an said coating layer extends into said threaded hole.

* * * * *